United States Patent
Albot et al.

(10) Patent No.: US 9,690,495 B2
(45) Date of Patent: Jun. 27, 2017

(54) EMULATING MEMORY MAPPED I/O FOR COHERENT ACCELERATORS IN ERROR STATE

(71) Applicant: International Business Machines Corporation, Armonk, NY (US)

(72) Inventors: Andre L. Albot, Austin, TX (US); Vishal C. Aslot, Austin, TX (US); Bruce Mealey, Austin, TX (US); Nicholas Stilwell, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 49 days.

(21) Appl. No.: 14/931,612

(22) Filed: Nov. 3, 2015

(65) Prior Publication Data
US 2017/0123684 A1 May 4, 2017

(51) Int. Cl.
*G06F 9/455* (2006.01)
*G06F 3/06* (2006.01)

(52) U.S. Cl.
CPC .......... *G06F 3/0611* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 7,441,254 B1 * | 10/2008 | Holland | G06F 9/44521 707/999.104 |
| 2003/0093258 A1 * | 5/2003 | Fishstein | G06F 9/45504 703/21 |
| 2009/0300613 A1 * | 12/2009 | Doi | G06F 9/45537 718/1 |
| 2012/0278818 A1 * | 11/2012 | Green | G06F 9/45533 719/321 |
| 2012/0284446 A1 | 11/2012 | Biran et al. | |

(Continued)

OTHER PUBLICATIONS

Wile, B.; "Coherent Accelerator Processor Interface (CAPI) for POWER8 Systems"; IBM Corporation, IBM System and Technology Group, Advance White Paper, www.ibm,com/legal/copytrade.shtml; Sep. 29, 2014.

(Continued)

*Primary Examiner* — Kevin Verbrugge
(74) *Attorney, Agent, or Firm* — Patterson + Sheridan, LLP

(57) ABSTRACT

Embodiments disclose techniques for emulating memory mapped I/O (MMIO) for coherent accelerators in an error state. In one embodiment, once an operating system determines that a processor is unable to access a coherent accelerator via a MMIO operation, the operating system deletes one or more page table entries associated with MMIO of one or more hardware contexts of the coherent accelerator. After deleting the page table entries, the operating system can detect a page fault associated with execution of a process by the processor. Upon determining that the page fault was caused by the process attempting to access one of the deleted page table entries while executing a MMIO operation, the operating system emulates the execution of the MMIO operation for the faulting process, giving the process the illusion that its requested MMIO operation was successful.

20 Claims, 7 Drawing Sheets

(56) References Cited

U.S. PATENT DOCUMENTS

2012/0304159 A1* 11/2012 Ceze .................. G06F 8/44
717/140
2014/0282819 A1    9/2014 Sastry et al.

OTHER PUBLICATIONS

Anonymously; "A novel prediction mechanism for accelerator execution time"; An IP.com Prior Art Database Technical Disclosure; http://ip.com/IPCOM/000203251; Jan. 21, 2011.

* cited by examiner

EMULATING MEMORY MAPPED I/O FOR COHERENT ACCELERATORS IN ERROR STATE

BACKGROUND

Embodiments disclosed herein relate to FPGA-based coherent accelerators, and more specifically, to emulating memory mapped input/output (I/O) for FPGA-based coherent accelerators in an error state.

Conventional hardware accelerators (e.g., PCI-based accelerators) perform operations requiring direct memory access (DMA) via a stack that includes a number of layers, providing user applications with access to the hardware accelerator. The hardware accelerator directs data to a physical memory address from a storage device attached to the hardware accelerator. The operating system sets up DMA to corresponding pages of physical memory for the application (i.e., a buffer for the application). Doing so allows the hardware accelerator to arbitrate on a connected bus (e.g., a PCI bus) to transfer I/O operations and system calls to the storage device via a series of SCSI commands executed in the hardware accelerator.

Some FPGA-based hardware accelerators provide an application with direct access to the hardware accelerator. For example, an FPGA-based coherent accelerator allows an application to execute SCSI commands directly within application memory. In contrast to traditional hardware accelerators that need physical addresses to execute bus commands, coherent accelerators use effective addresses to issue bus commands to an attached storage device. As a result, an operating system does not need to perform actions that are typical (and computationally expensive) to a traditional hardware accelerator, such as translating effective addresses to physical addresses, which requires steps such as pinning memory pages to prevent page faults. A coherent accelerator translates effective addresses to real addresses while accelerating a function. Therefore, the operating system, via the coherent accelerator, allows page faults to occur, handling the page faults such that the accelerator may continue to access application memory. A coherent accelerator translates effective addresses to real addresses while accelerating a function. Therefore, the operating system, via the coherent accelerator, allows page faults to occur, handling the page faults such that the accelerator may continue to access application memory. This approach greatly reduces the length of instructions required to set up a DMA path for data transfer.

User applications can also control FPGA-based coherent accelerators via memory mapped I/O (MMIO). MMIO generally uses the same address bus to address both memory and I/O devices (e.g., FPGA-based coherent accelerators, etc.). The I/O device's registers are mapped to address values in the memory space used by the applications. As such, the instructions that are used to access the physical memory can also be used to access the I/O devices. As an example, when a user application accesses an address, the address may refer to a portion of physical RAM or may refer to registers on the I/O device.

In some cases, FPGA-based coherent accelerators can implement an error recovery protocol to prevent applications from crashing or performing invalid actions when the accelerators encounter certain events, such as, triggering a reset of the accelerator, encountering errors on the link, and other types of errors that require recovery. Once error recovery is initiated, applications may continue attempts to access the accelerators via MMIO without knowing that the accelerators have encountered an error. Such behavior is possible because applications can generally directly access FPGA-based coherent accelerators without involving device drivers or the kernel (unless there is a page fault or error interrupt). Accessing coherent accelerators in this manner, however, can cause undesirable behavior, such as, e.g., applications crashing, operation system crashes, and the like.

SUMMARY

One embodiment presented herein describes a method for emulating a memory mapped I/O (MMIO) operation for a coherent accelerator. The method generally includes upon determining that a processor is unable to access the coherent accelerator via a MMIO operation, deleting one or more page table entries associated with MMIO of one or more hardware contexts of the coherent accelerator. The method also includes detecting a page fault associated with execution of a process by the processor after deleting the page table entries. The method further includes, upon determining that the page fault was caused by the process attempting to access one of the deleted page table entries while executing a MMIO operation, emulating the execution of the MMIO operation for the faulting process.

Other embodiments include, without limitation, a computer program product that includes a non-transitory storage medium having computer-readable program code that enables a processing unit to implement one or more aspects of the disclosed methods as well as a system having a processor, memory, and application programs configured to implement one or more of the disclosed methods.

DETAILED DESCRIPTION

Figure 1:
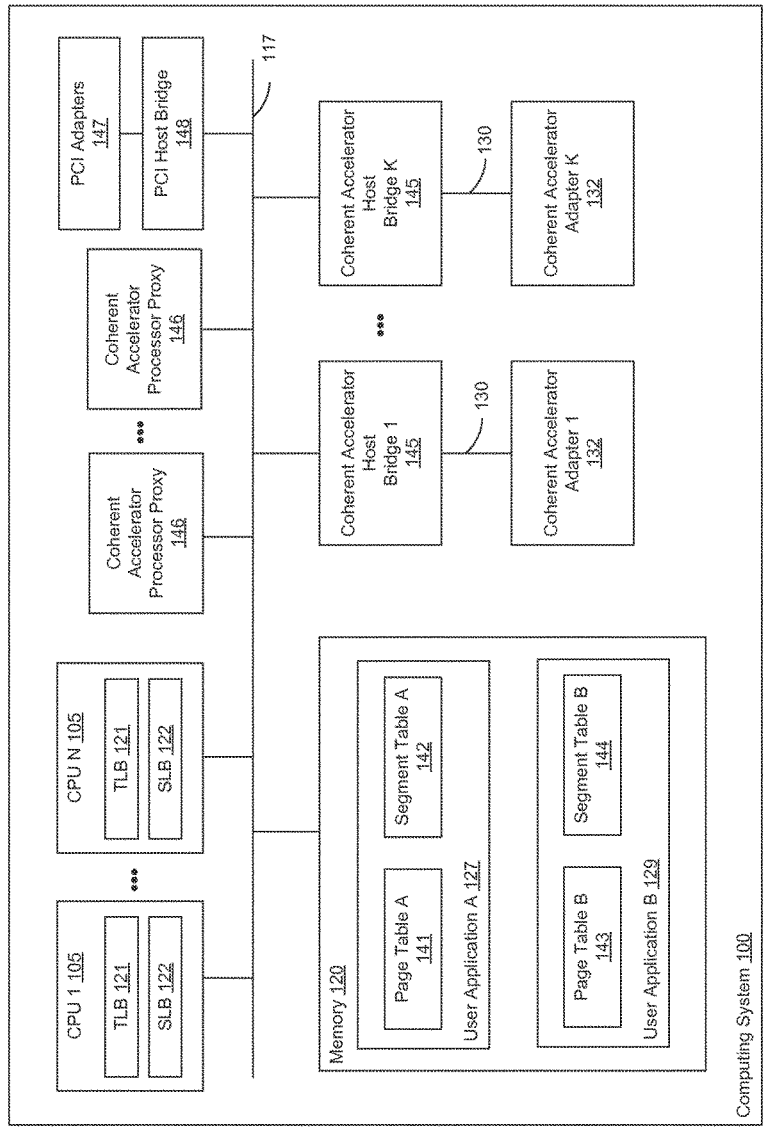
FIG. 1 illustrates an example computing system configured with a coherent accelerator, according to one embodiment.

Embodiments presented herein disclose techniques for preventing applications (or processes) from accessing coherent accelerators via MMIO while coherent accelerators are in an error state. An error state can occur due to a coherent accelerator becoming inaccessible via the address bus (e.g., due to a link-down event), a coherent accelerator undergoing a reset operation (e.g., due to downloading a new image to the coherent accelerators, etc.), and other type of events. Generally, embodiments disclosed herein allow an operating system to emulate MMIO for coherent accelerators undergoing error recovery to avoid the undesirable behavior associated with accessing coherent accelerators via MMIO where the coherent accelerators have encountered an error. For example, as described below, instead of allowing accelerators to execute MMIO instructions from applications, the techniques presented herein allow the operating system to execute the instructions in software and return an outcome of the instruction to the applications, which gives the applications the appearance that their MMIO operation was successful and allows the coherent accelerators to complete the error recovery process uninterrupted.

In one embodiment, once the operating system detects an error associated with a FPGA-based coherent accelerator, the operating system removes all page table entries related to the MMIO regions of every hardware context associated with the accelerator. Removing the page table entries associated with MMIO regions ensures that a subsequent MMIO operation by an application (or process) will generate a page fault (e.g., due to the missing page table entry). Using the load doubleword (ld) instruction as a reference example, if an application attempts to execute a "ld r5, x(r3)" instruction, where r3 contains a MMIO address, the application will encounter a page fault. Once the page fault occurs, the operating system examines a page fault state associated with the page fault to determine if the effective address from r3 is a MMIO address. To do so, in one embodiment, the operating system can examine data structures associated with a memory manager to determine if the effective address from r3 falls into one of the MMIO regions.

In one embodiment, once the operating system determines the page fault is due to a missing page table entry for an effective address for MMIO, the operating system reads the MMIO instruction (e.g., "ld r5, x(r3)") from the faulting application and emulates execution of the instruction (i.e., decoding the opcode associated with the instruction in software). Based on the decoding operation, the operating system can determine the type of instruction (e.g., load, store, etc.), what operation to perform, outcome of the operation, etc. In one embodiment, if the MMIO instruction is a read operation, the operating system returns all Fs (or −1) to the destination register and increments the program counter (PC) to the next instruction. Using the "ld r5, x(r3)" instruction as a reference example, in this case, the operating system would return eight Fs into the destination register r5. In one embodiment, if the MMIO instruction is a store operation, the operating system ignores the instruction and increments the PC to the next instruction. In this manner, the operating system gives the application the illusion that its MMIO operation was successful (e.g., even though the operation either returned invalid data or was ignored).

In one embodiment, once the application receives all Fs, the application can stop using its MMIO range, detach its stale context and/or attempt to attach a new context. The attach of the new context will block until the error recovery process is complete. Once the attach succeeds, the application may receive a new MMIO range, which will allow the application to control the accelerator.

Advantageously, the techniques presented herein can ensure that an application (or its libraries) does not access the accelerator once the operating system detects an error, while at the same time giving the application the appearance that its MMIO operations is successful.

Note, the following describes a coherent accelerator processor interface (CAPI) as a reference example of a FPGA-based coherent accelerator that remaps effective addresses of user space processes (e.g., applications, libraries, etc.) to a global address space in a kernel context. However, one of skill in the art will recognize that the embodiments disclosed herein may be adapted to a variety of coherent accelerators that allow sharing of hardware contexts between user space applications and libraries. Further, embodiments described below use the load doubleword instruction as a reference example of a MMIO read operation that may be emulated using the techniques presented herein, and use the store doubleword with update instruction as a reference example of a MMIO write operation that may be emulated using the techniques presented herein. Those of ordinary skill in the art will understand, however, that the techniques presented herein can be used for any type of instruction and/or for any type of instruction architecture set.

FIG. 1 illustrates an example computing system 100 configured with an FPGA-based coherent accelerator, according to one embodiment. As shown, computing system 100 includes one or more central processing units (CPUs) 1-N 105, one or more coherent accelerator processor proxies (CAPPs) 146, one or more peripheral component interconnect (PCI) adapters 147, one or more PCI host bridges 148, a memory 120, one or more coherent accelerator host bridges 1-K 145, and one or more coherent accelerator adapters 1-K 132. The CPUs 105, CAPPs 146, PCI host bridges 148, memory 120, and coherent accelerator host bridges 145 may each be connected via an interconnect bus 117. Further, the coherent accelerator adapters 132 may each connect with a respective coherent accelerator host bridge 145 via a CAPI bus 130. The computing system may also include an I/O device interface connecting I/O devices (e.g., keyboard, display, and mouse devices) to the computing system 100. Storage devices may be connected via one of the coherent accelerator adapters 132 or PCI adapters 147. The CPUs 105 each include a translation lookaside buffer (TLB) 121 and a segment lookaside buffer (SLB) 122.

Each CPU 105 retrieves and executes programming instructions stored in the memory 120 as well as stores and retrieves application data residing in the storage devices. The bus 117 is used to transmit programming instructions and application data between the CPUs 105, CAPPs 146, PCI host bridges 148, coherent accelerator host bridges 145, and memory 120. In one embodiment, CPU 105 is representative of the "POWER" microprocessor by IBM. In one embodiment, the bus 117 is also used by the applications and/or CPUs 105 to perform MMIO operations to the coherent accelerators.

In one embodiment, the coherent accelerator adapter 132 is a FPGA-based hardware accelerator that may directly access an effective address space of an application (e.g., the user application A 127, user application B 129, etc.). Each application has its own effective address space. For example, a 32-bit process may have an effective address space from $2^0$ to $2^{32}$. Further, each address space comprises a number of virtual memory segments. A segment is a logical container of pages. A page is a fixed-size piece of memory. The 32-bit effective address space described in this example may contain up to sixteen segments. As another example, a 64-bit effective address space may contain up to $2^{36}$ segments. Further still, each effective address in a process effective address space includes an effective segment identifier (ESID), which specifies a segment for that effective address.

In some systems, effective addresses in a user application address space do not map directly to real memory. In one embodiment, an operating system of computing system 100 maintains a global virtual address space that maps to real memory. Further, the global virtual address space comprises a number of segments, where each virtual address includes a virtual segment identifier (VSID) that specifies a segment for that virtual address. In addition, each effective address maps into a location in the global virtual address space.

The coherent accelerator adapter 132 provides a general purpose framework for transferring data to and from application memory, without requiring a direct memory access (DMA) setup. As a result, the coherent accelerator adapter 132 significantly reduces the I/O path length (e.g., from tens of thousands of instructions to a few hundred instructions). Further, the coherent accelerator adapter 132 allows developers to customize on the FPGA without having to create additional software to do so. For instance, user application A 127 is an example of a process that is configured to issue commands to the coherent accelerator adapter 132. Other applications that are not configured to issue commands to the coherent accelerator adapter 132 (e.g., user application B) may still execute within the framework provided by the coherent accelerator adapter 132. The coherent accelerator adapter 132 provides data transfer between storage devices and applications via a virtual address space.

In one embodiment, the user application A 127 includes a page table A 141 and a segment table A 142. In addition, the user application B 129 includes a page table B 143 and a segment table B 144. The page tables 141 and 143 map virtual pages to corresponding physical addresses in memory 120. The segment tables 142 and 144 stores mappings of effective addresses to virtual addresses for their respective application. In one embodiment, the TLB 121 and the SLB 122 of the CPU 105 are lookaside buffers used by the coherent accelerator adapter 132 to maintain recent translations of memory addresses. For instance, the SLB 122 may maintain recent translations of effective addresses to virtual addresses. In addition, the TLB 121 may maintain recent translations of virtual addresses to real addresses. In one embodiment, the page tables 141 and 143, segment tables 142 and 144, TLB 121, and SLB 122 may be included in a memory management unit (MMU). In one embodiment, the CAPPs 146 enforce coherence in the processor service layers (shown in FIG. 2) of each coherent accelerator adapter 132. To do so, the CAPPs 146 may monitor coherency traffic (e.g., relating to cache coherence, page table coherence, segment table coherence, etc.) on the bus 117.

Figure 2:
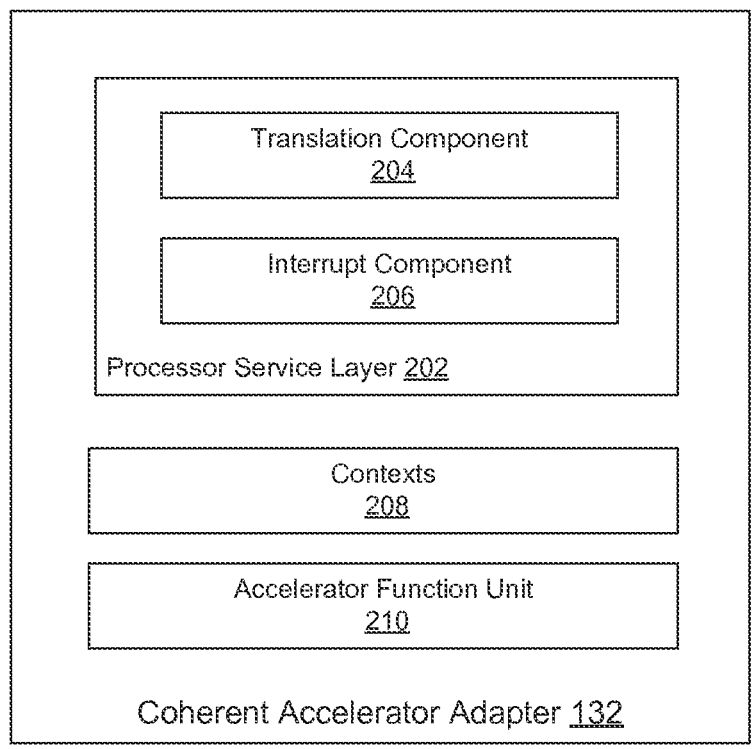
FIG. 2 illustrates an example of a coherent accelerator, according to one embodiment.

FIG. 2 further illustrates an example of the coherent accelerator adapter 132 described relative to FIG. 1, according to one embodiment. As shown, the coherent accelerator adapter 132 includes a processor service layer (PSL) 202 and accelerator function unit (AFU) 210. The coherent accelerator adapter 132 allows transfer of data between a storage device and an effective address space of a given application via the AFU 210. The application and the AFU 210 may transfer data to one another using effective addresses. PSL 202 includes translation component 204 and interrupt component 206. In one embodiment, the PSL 202 is a memory management unit (MMU). In one embodiment, the translation component 204 is configured to translate effective addresses to real addresses in order to provide coherence. For example, the translation component 204 can translate effective addresses to virtual addresses using an SLB similar to SLB 122, and can translate virtual addresses to real addresses using a TLB similar to TLB 121. In one embodiment, the interrupt component 206 is configured to generate page faults and AFU-specific interrupts.

As shown, the coherent accelerator adapter 132 also includes hardware contexts 208. A FPGA-based hardware accelerator generally includes a number of hardware contexts 208 in user space and kernel space. These contexts 208 provide processes (executing in computing system 100) with direct access to the coherent accelerator adapters 132 via effective addresses (as opposed to real addresses in physical memory). As a result, the coherent accelerator adapters 132 significantly reduce the amount of instructions needed for I/O operations and system calls for direct memory (DMA), particularly when compared to a conventional PCI accelerator.

In one embodiment, a context 208 may be exclusively used by an application. Typically, however, the amount of hardware contexts 208 provided by the coherent accelerator adapter 132 is limited. For example, a coherent accelerator may include a few hundred contexts 208 available to processes executing in the computing system. Thus, the coherent accelerator adapter, via the operating system, allows processes (e.g., user applications A, B, etc.) to share contexts 208 if the amount of processes exceeds the total amount of contexts, which in turn allows a greater amount of processes to access the coherent accelerator. In one embodiment, a context 208 may be owned by a coherent accelerator device driver (e.g., device driver 310 shown in FIG. 3) and shared by many applications. In one embodiment, a context 208 may be owned by a library and shared by many processes in the user space.

The hardware contexts 208 provide resources to an application (or the kernel). The resources can include, without limitation, a segment table that gives the context access to an application's address space directly (the "coherent" property of the hardware accelerator), a number of interrupt sources (for page faults, errors, and the like), a command/response queue (e.g., a description of desired operations, such as encryption, or description of a specified portion of memory), and a memory mapped I/O range. An application (or the kernel) attaching to a hardware context 208 inherits these resources. Doing so allows the application to control the coherent accelerator adapter 132 (e.g., issue commands, MMIO operations, etc.) and allows the coherent accelerator adapter 132 to read and/or write data directly from the application's address space without having to go through the device driver or kernel to set up DMA.

In some embodiments, the hardware contexts 208 can be viewed as a run-queue, where the coherent accelerator adapter 132 can execute commands associated with each context 208. Generally, the coherent accelerator adapter 132 executes commands for a single context 208 at any given time. The coherent accelerator adapter 132 may move through the run-queue of contexts 208 using any number of switching methods. For example, the coherent accelerator adapter 132 may perform "round robin" through the contexts, switching on a specific time period (e.g., every 10 ms). In another case, the coherent accelerator adapter 132 may switch to a different context when the current context encounters a page fault, or switch to a different context when that respective context's data becomes available. Regardless of the specific method used to switch between contexts, the coherent accelerator adapter 132 provides quality of service (QoS) for the applications exploiting the coherent accelerator adapter 132.

Figure 3:
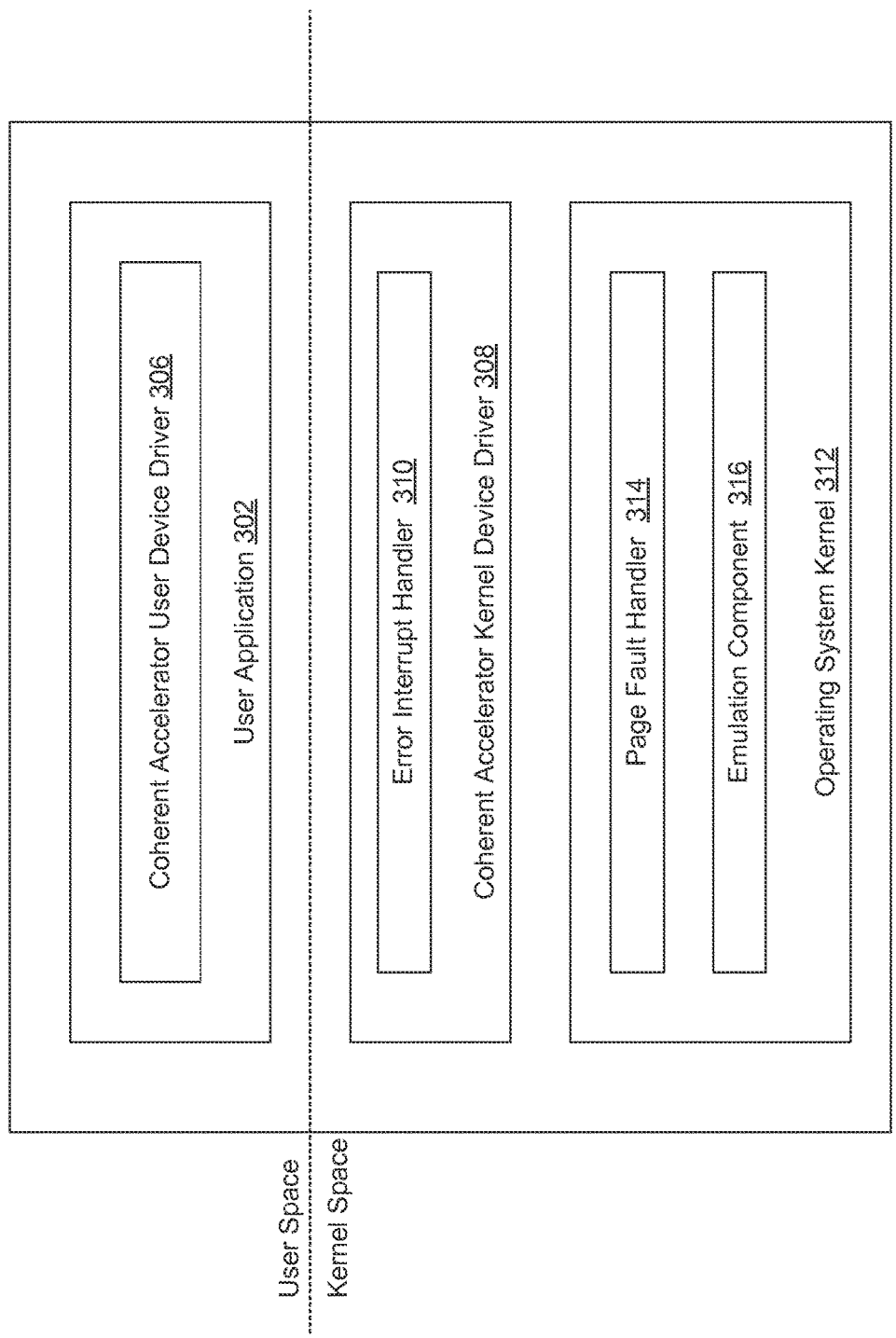
FIG. 3 illustrates an abstraction of a user application configured to communicate with a coherent accelerator, according to one embodiment.

FIG. 3 illustrates an abstraction of a user application 302 configured to communicate with a coherent accelerator, according to one embodiment. Illustratively, FIG. 3 depicts the user application 302 in user space of the operating system of the computer system 100. Further, FIG. 3 depicts a coherent accelerator kernel device driver 308 and an operating system kernel 312 in kernel space of the operating system.

In one embodiment, the operating system kernel 312 manages memory, tasks, processes, and disks in the operating system. The operating system kernel 312 includes page fault handler 314 and emulation component 316. The page fault handler 314 is generally configured to resolve page faults experienced by processes executed on the CPU 105. When the CPU 105 tries to access a location from a page that is not present in memory, the operating system may interrupt the CPU 105, which halts the process on the CPU 105. The operating system may invoke the page fault handler 314, which receives state information for the page fault. The state information may include, without limitation, the reason for the page fault (e.g., missing page, missing translation, protection fault, etc.), the faulting address (e.g., address that caused the page fault), the type of instruction (e.g., load, store, etc.) that caused the page fault, the program counter (or instruction address register) for the instruction (or operation) that caused the fault, etc. The page fault handler 314 may then perform any number of operations to handle the page fault. For example, the page fault handler 314 may find where the desired page resides (e.g., on a storage device), and read the page into memory, or create the appropriate page table entry in the page table. If the page fault handler 314 is unable to resolve the page fault and make the requested page available in memory, the operating system may abort the offending process.

The user application 302 is configured to send I/O operations and commands to the coherent accelerator adapter 132 and parse responses from the coherent accelerator adapter 132. The user application 302 may use its own context to communicate with the coherent accelerator adapter 132 directly without going through the kernel context. Queuing commands in the user space, rather than via kernel through read and/or write system calls, etc., can significantly reduce software latency, and thus increase the overall throughput of the I/O.

In one embodiment, the user application 302 includes a coherent accelerator user device driver 306. The device driver 306 is a full user-mode driver that enables the user application 302 to communicate with the coherent accelerator adapter 132. In some embodiments, the device driver 306 can be included within a user space library that packages common routines that the application 302 can use to control the coherent accelerator adapter 132. For example, these routines can be used to handle page faults, errors, and other exceptions from the coherent accelerator adapter 132. The device driver 306 is also configured to receive interrupts and perform MMIO operations (e.g., loads, stores, etc.) to the coherent accelerator adapter 132. The device driver 306 may receive and process UNIX signals once an interrupt arrives from the coherent accelerator adapter 132 and/or poll( )/select( ) on the interrupts. Once the user application 302 (or library) detects that an interrupt is pending, the user application 302 may query the coherent accelerator adapter 132 via a separate system call to handle the interrupt, which may include performing MMIO (e.g., to restart the coherent accelerator adapter 132).

Figure 4:
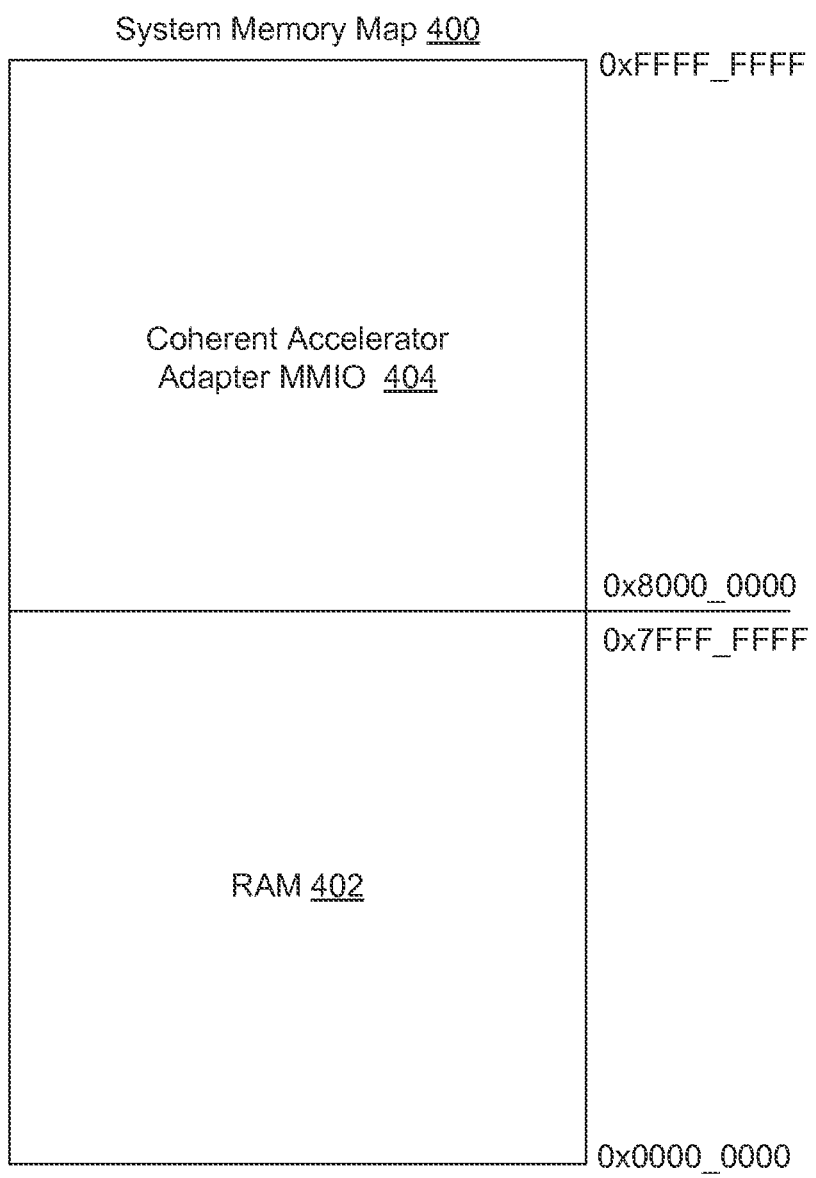
FIG. 4 illustrates an example system memory map with a MMIO region, according to one embodiment.

As mentioned above, in one embodiment, the user application 302 can control the coherent accelerator adapter 132 directly from the user space via MMIO. Referring to FIG. 4, FIG. 4 illustrates one example of a system memory map 400 that includes a MMIO region 404 mapped to the same address space as system memory, such as RAM. As shown, the address range from 0x0000_0000 to 0x7FFF_FFFF is used for RAM 402 and the address range from 0x8000_0000 to 0xFFFF_FFFF is used for MMIO to the coherent accelerator adapter 132. The addresses in the MMIO region 404 correspond to one or more registers of the coherent accelerator adapter 132. The user application 302 can address the MMIO region 404 through effective addresses. Note that FIG. 4 illustrates merely one example of mapping accessibility to registers on the coherent accelerator adapter to the same bus address used to access system memory, such as RAM. Those of ordinary skill in the art will recognize that the system memory map may include other portions that refer to other types of memory (e.g., read only memory (ROM)) and/or other types of devices (e.g., general purpose I/O, sound controllers, video controllers, etc.). Further, those of ordinary skill in the art will recognize that the system memory map may include different address ranges for the various different portions.

Referring back to FIG. 3, the coherent accelerator kernel device driver 308 is configured to control the coherent accelerator adapter 132. The kernel device driver 308 may provide a set of entry points (e.g., open, close, ioctl, read, write, select, etc.). The coherent accelerator kernel device driver 308 includes an error interrupt handler 310. The error interrupt handler 310 is generally configured to process error interrupts received from the hardware of computing system 100, such as the coherent accelerator adapter 132. For example, as mentioned above, in some cases, the coherent accelerator adapter 132 may encounter errors due to the coherent accelerator adapter 132 becoming inaccessible via the bus 130 (and/or bus 117), triggering a reset of the coherent accelerator adapter, and the like. When the error interrupt handler 310 receives an error interrupt, the kernel device driver 310 may implement an error recovery protocol to attempt to resolve the error. Such error recovery protocol may be implemented to avoid application outage where the application 302 may crash or perform an invalid behavior.

In one embodiment, the kernel device driver 310 may attach and detach contexts to the coherent accelerator adapter 132 on behalf of application memory. Further, the kernel device driver 310 may perform MMIO to the coherent accelerator adapter 132. In addition, the kernel device driver 310 may register a kernel context in the coherent accelerator.

As mentioned above, compared to conventional PCI devices, the user application 302 can generally access the coherent accelerator adapter 132 without involving the kernel device driver 308 or the operating system kernel 312 (unless there is page fault, etc.). In these cases, even when the coherent accelerator device 132 is no longer accessible by the applications or CPU, e.g., due to an error, the user application 302 may still continue attempts to access the coherent accelerator adapter 132 via MMIO in the user space, not knowing that the coherent accelerator adapter 132 has encountered an error that requires recovery. Accessing the coherent accelerator adapter 132 in this manner while error recovery is in progress can cause undesirable behavior in the computing system 100, such as causing user application 302 (and other user applications) to crash, causing the operating system to crash, etc.

In one embodiment, once the kernel device driver 308 detects that the coherent accelerator adapter 132 is in an error state (e.g., in error recovery), the kernel device driver 308 is configured to remove all hardware contexts 208 associated with the coherent accelerator adapter 132. The kernel device driver 308 also deletes all page table entries related to MMIO of every hardware context 208 of the coherent accelerator adapter 132. Such removal may be transparent to the user application 302 (i.e., without the user application's knowledge). In one embodiment, the kernel device driver 308 may mark each of the MMIO regions 404 as "stale" regions, and each removed context 208 as a "stale" context (e.g., to indicate that they are invalid and/or should no longer be used). The kernel device driver 308 may also notify the operating system kernel 312 that the coherent accelerator adapter 312 is in error recovery.

Once the kernel device driver 308 removes the page table entries, the next MMIO operation from the application 302 will encounter a page fault (thus halting the execution of the process on the CPU 105) due to the missing page table entry. As a reference example, if "ld r1, x(r2)" is an instruction which attempts to load the contents of the register r2 (from the coherent accelerator adapter 132) into the register r1, the application 302 will encounter a page fault, since the page table entry for the effective address at r2 is missing. Once a page fault occurs, the operating system kernel 312 may then invoke the page fault handler 314 to attempt to resolve the page fault. The page fault handler 314 can examine the instruction address, which it receives from the state information associated with the page fault, to determine whether the effective address from r2 is a MIMO address. In one case, the page fault handler 314 can examine data structures associated with the memory manager to determine if the effective address from r2 is a MIMO address. Once the emulation component 316 obtains the address of the instruction from the page fault state information, the emulation component 316 reads the instruction, and emulates execution of the instruction in software.

Using the "ld r1, x(r2)" instruction as an example, the emulation component 316 can locate such instruction based on the program counter (or instruction address register) obtained from the page fault state information. Once located, the emulation component 316 reads the object code (e.g., four byte bit pattern) for the instruction and parses the bit pattern to determine the type of instruction, the operation to perform, outcome of the operation, source and/or destination registers, etc. For example, for "ld r1, x(r2)," the emulation component 316 can determine based on parsing of the first 6 bits of the 4 byte bit pattern (which represent the opcode of the instruction) that the instruction is for a "ld" operation. The emulation component 316 can also determine other characteristics of the instruction in this manner. In some embodiments, the emulation component 316 is configured to parse the respective bit patterns based on knowledge of the format of the instructions used by the operating system. The format can be based on any instruction set architecture, including, e.g., PowerPC instruction set architecture, x86, ARM, etc.

Once the emulation component 316 determines the characteristics of the instruction, the emulation component 316 emulates execution of the instruction by performing the expected outcome of the instruction. In one embodiment, if the instruction is a load operation (or MMIO read operation), the emulation component 316 loads all Fs (or −1) into the destination memory location and increments the PC by 4 bytes to the next instruction. The emulation component 316 can determine the expected format of the data to return and the expected destination of the data based on the parsing of the instruction. For example, for "ld r1, x(r2)," the emulation component 316 loads eight Fs into the destination register r1. In one embodiment, if the instruction is a store operation (or MMIO write operation), such as "stdu r1, x(r2)," the emulation component 316 ignores the instruction and increments the PC (e.g., PC+4 bytes) to the next instruction. Doing so in this manner gives the application 302 the illusion that its MMIO operation was successful, even though the MMIO operation returned invalid data (e.g., all Fs) or was ignored.

In one embodiment, the return of all Fs indicates to the application 302 that the coherent accelerator adapter 132 is in error recovery. At this point, the application 302 stops using its "stale" MMIO region. In some cases, the application 302 may attempt to start the error recovery process. Such attempt may be ignored if the error recovery process is in progress. The application 302 may also detach its context (as the context is no longer valid), and attempt to attach a new one. In one embodiment, the operating system may block the attempt to attach a new context until the error recovery is complete. Once the new attach succeeds, the application 302 can receive a new MMIO range that allows it to control the accelerator adapter 132.

Figure 5:
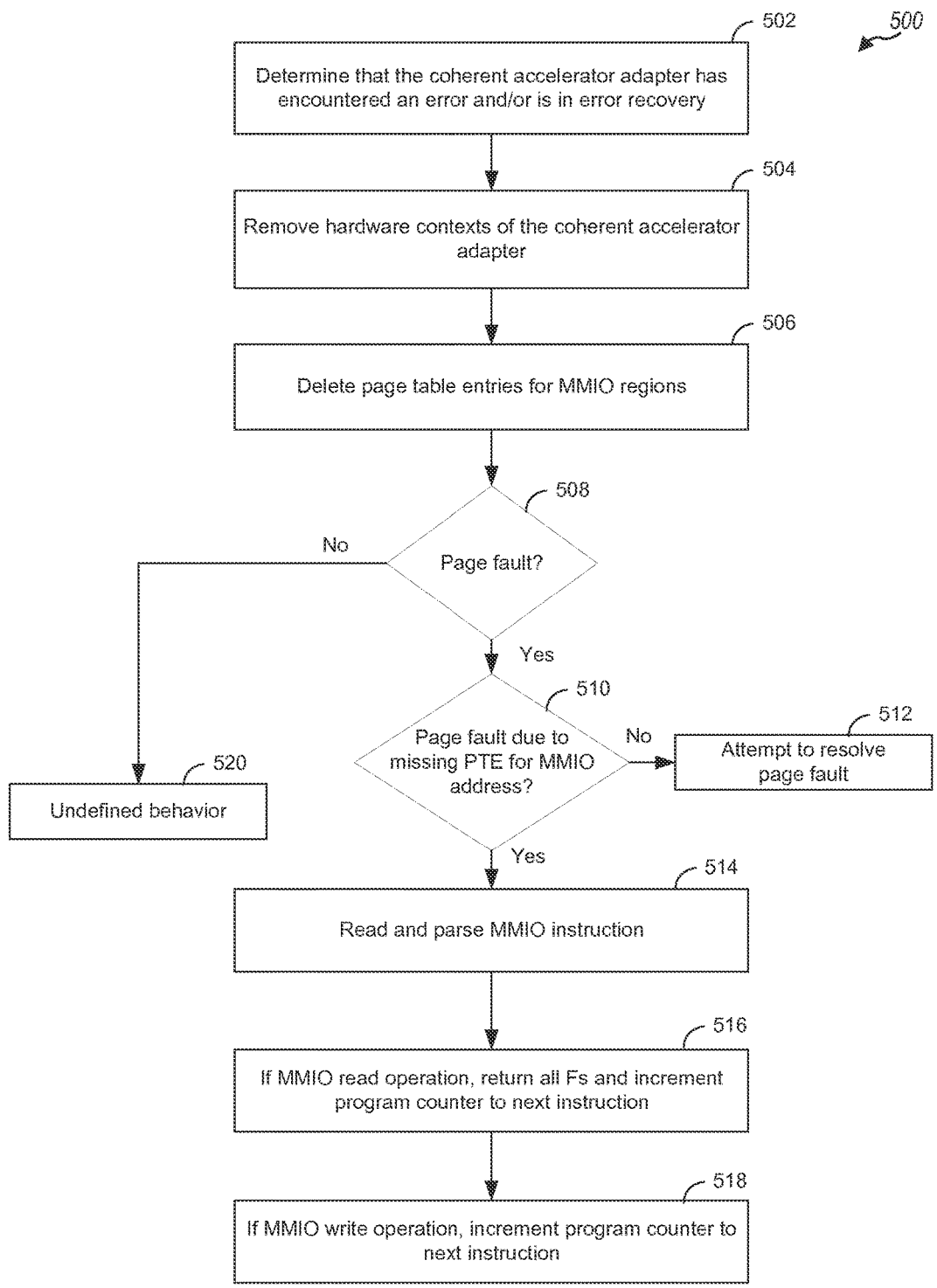
FIG. 5 illustrates a method for emulating MMIO for a coherent accelerator, according to one embodiment.

FIG. 5 illustrates a method 500 for emulating MMIO for a coherent accelerator adapter in an error state, according to one embodiment. As shown, the method 500 begins at step 502, where the operating system determines that the coherent accelerator adapter 132 has encountered an error and/or is in error recovery. As mentioned above, this may include determining that the processor is unable to access the coherent accelerator adapter 132 via a MMIO operation. At step 504, the operating system removes the coherent accelerator adapter's hardware contexts. At step 506, the operating system deletes page table entries associated with MMIO of every hardware context. At step 508, the operating system determines whether a page fault associated with execution of a process by the processor has occurred. If not, at step 520, the outcome of MMIO load/store to the coherent accelerator is undefined. Therefore, the operating system removes all MMIO page table entries before starting the recovery. On the other hand, if the operating system determines, at step 508, that a page fault has occurred, at step 510, the operating system determines whether the page fault is due to a missing page table entry for a MMIO address. If not, at step 512, the operating system attempts to resolve the page fault. On the other hand, if the operating system determines, at step 510, that the page fault is due to a missing page table entry for a MIMO address, at step 514, the operating system reads and parses the instruction. At step 516, if the operating system determines that the instruction is a MMIO read operation, the operating system returns all Fs (or −1) to the application and increments the PC to the next instruction. At step 518, if the operating system determines that the instruction is a MMIO write operation, the operating system ignores the instruction and increments the PC to the next instruction.

In this manner, the techniques presented herein can take away application(s) access whenever the coherent accelerator adapter encounters an error and undergoes an error recovery process. As such, the techniques presented herein can prevent applications and/or the operating system from crashing while the coherent accelerator adapter 132 is going through error recovery.

Figure 6:
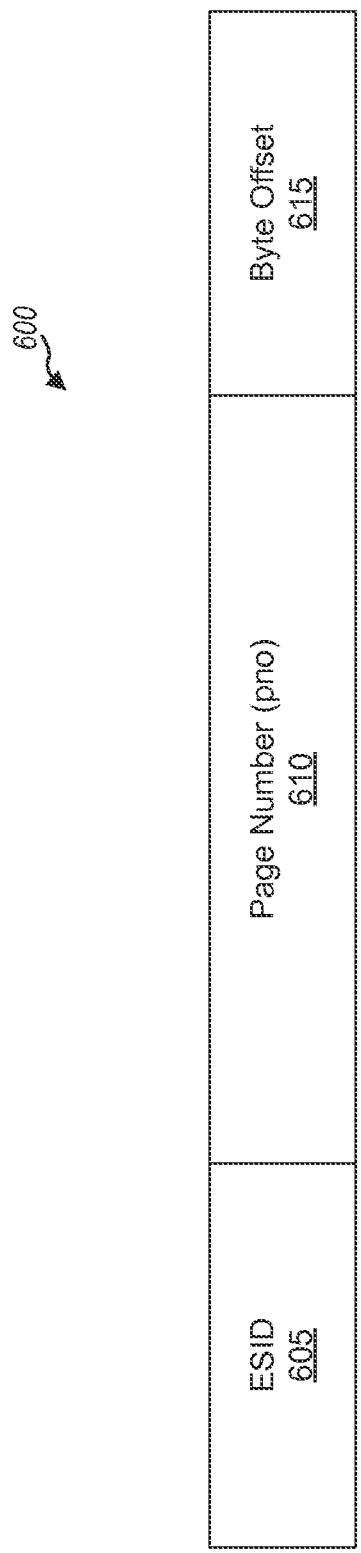
FIG. 6 illustrates an example layout of an effective address, according to one embodiment.

FIG. 6 illustrates an example layout of an effective address 600, according to one embodiment. As shown, the effective address 600 includes an effective segment identifier (ESID) 605, a page number (PNO) 610, and a byte offset 615. The ESID 605 specifies a segment in a process' effective address space that the effective address 600 belongs to. A given segment may include a range of addresses. For example, in a 32-bit effective address space, an ESID 605 of 0x0 may include a range of addresses 0x0000_0000 to 0x0FFF_FFFF, an ESID 605 of 0x1 may include a range of addresses 0x0000_0000 to 0x1FFF_FFFF, and so on.

Further, the PNO 610 specifies an index of a page within that segment. The byte offset 615 specifies an offset of a byte within that page. In practice, for a 32-bit effective address, an ESID 605 of 5 bits, a PNO 610 of 16 bits, and a byte offset 615 of 12 bits have shown to be effective. For a 64-bit effective address, an ESID 605 of 46 bits, a page number of 16 bits, and a byte offset of 12 bits has shown to be effective.

Figure 7:
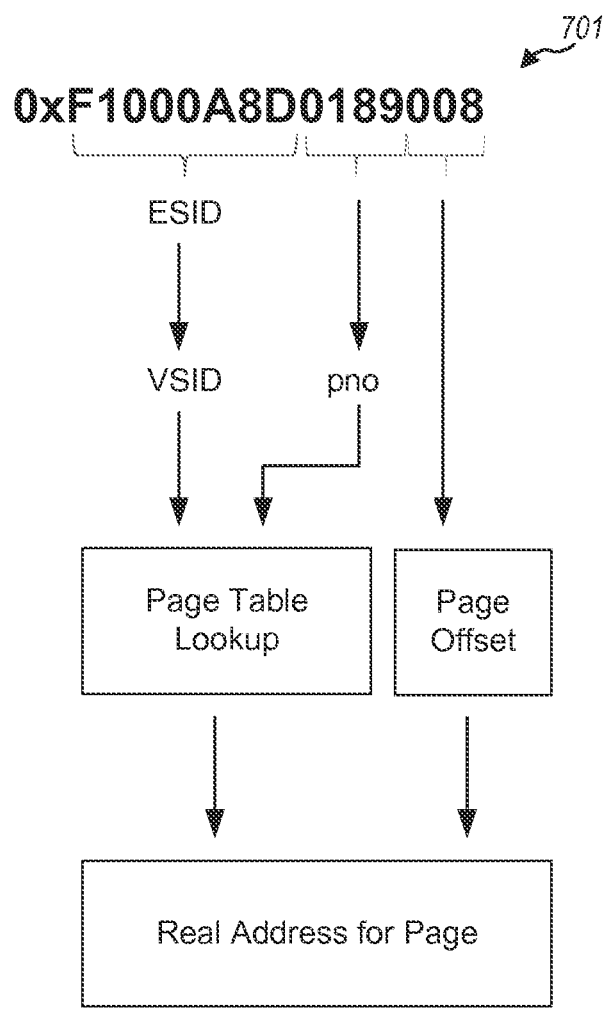
FIG. 7 illustrates an example flow of translating an effective address to a real address, according to one embodiment.

FIG. 7 illustrates an example flow of translating an effective address to a real address, according to one embodiment. In at least one embodiment, the translation component 204 of the coherent accelerator adapter 132 performs the translation. However, the CPU 105, device driver 306, coherent accelerator kernel device driver 308, and the operating system kernel 312 are each configured to similarly translate effective addresses to real addresses.

In one embodiment, the effective address may be generated by a process, and is specific to that process. In one embodiment, the effective address may be a MMIO address for a register on the coherent accelerator adapter 132. For example, the device driver 306 (in user space) may receive a request from an application to perform MMIO to the coherent accelerator adapter 132. The request may specify an effective address for a location in a MMIO region, as depicted by the effective address 701 of 0xF1000A8D189008. Illustratively, the portion "F1000A8D" represents the ESID 605 of the effective address 701. The portion '0189' represents the PNO 610 of the effective address 701. The '008' portion represents the byte offset 615 of the effective address 701.

In one embodiment, the kernel device driver 308 translates the ESID of the effective address to a corresponding VSID. In at least one embodiment, the translation from ESID to VSID is performed by referencing a mapping of the ESID of the process to a VSID specified in the STAB (or segment table 142/144). Once the VSID is identified, the VSID and PNO combination are used to translate the virtual address to a real address. In at least one embodiment, a hash of the VSID and the PNO is used as an index into the page table 141/413, which returns the real address of a page. The byte offset is then applied to the page returned from the lookup of the page table, returning a real address in memory.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

While the foregoing is directed to embodiments of the present disclosure, other and further embodiments of the invention may be devised without departing from the basic scope thereof, and the scope thereof is determined by the claims that follow.

What is claimed is:

1. A method for emulating a memory mapped I/O (MMIO) operation for a coherent accelerator, the method comprising:
   upon determining that a processor is unable to access the coherent accelerator via a MMIO operation, deleting one or more page table entries associated with MMIO of one or more hardware contexts of the coherent accelerator;
   detecting a page fault associated with execution of a process by the processor after deleting the page table entries; and
   upon determining that the page fault was caused by the process attempting to access one of the deleted page table entries while executing a MMIO operation, emulating the execution of the MMIO operation for the faulting process.

2. The method of claim 1, further comprising, upon detecting the page fault, receiving information that specifies at least one of an effective address that triggered the page fault, and a program counter for the faulting process.

3. The method of claim 2, wherein determining that the page fault was caused by the process attempting to access one of the deleted page table entries comprises identifying that the effective address belongs to a range of addresses used for MMIO between the processor and the coherent accelerator.

4. The method of claim 2, wherein emulating execution of the MMIO operation comprises:
   locating an instruction for the MMIO operation based on the program counter; and
   parsing a bit pattern for the instruction to determine one or more characteristics of the MMIO operation, wherein the one or more characteristics indicate at least one of a type of MMIO instruction, a source memory location, and a destination memory location.

5. The method of claim 4, further comprising:
   upon determining that the instruction is for a MMIO read operation to the coherent accelerator, returning an outcome of the emulated execution to the faulting process, wherein the outcome comprises invalid data, and incrementing the program counter to a subsequent instruction.

6. The method of claim 4, further comprising:
upon determining that the instruction is for a MMIO write operation to the coherent accelerator, ignoring the instruction and incrementing the program counter to a subsequent instruction.

7. The method of claim 5, wherein a value of the invalid data is negative one, and wherein the invalid data indicates to the faulting process that the coherent accelerator is inaccessible, via MMIO, from the processor.

8. The method of claim 7, wherein the process ceases requests to perform MMIO operations to the coherent accelerator upon indication of the invalid data.

9. A system, comprising:
a processor;
a coherent accelerator; and
a memory storing program code, which, when executed on the processor, performs an operation comprising:
upon determining that the processor is unable to access the coherent accelerator via a MMIO operation, deleting one or more page table entries associated with MMIO of one or more hardware contexts of the coherent accelerator;
detecting a page fault associated with execution of a process by the processor after deleting the page table entries; and
upon determining that the page fault was caused by the process attempting to access one of the deleted page table entries while executing a MMIO operation, emulating the execution of the MMIO operation for the faulting process.

10. The system of claim 9, wherein the operation further comprises:
upon detecting the page fault, receiving information that specifies at least one of an effective address that triggered the page fault, and a program counter for the faulting process.

11. The system of claim 10, wherein determining that the page fault was caused by the process attempting to access one of the deleted page table entries comprises identifying that the effective address belongs to a range of addresses used for MMIO between the processor and the coherent accelerator.

12. The system of claim 10, wherein emulating execution of the MMIO operation comprises:
locating an instruction for the MMIO operation based on the program counter; and
parsing a bit pattern for the instruction to determine one or more characteristics of the MMIO operation, wherein the one or more characteristics indicate at least one of a type of MMIO instruction, a source memory location, and a destination memory location.

13. The system of claim 12, wherein the operation further comprises:
upon determining that the instruction is for a MMIO read operation to the coherent accelerator, returning an outcome of the emulated execution to the faulting process, wherein the outcome comprises invalid data, and incrementing the program counter to a subsequent instruction.

14. The system of claim 12, wherein the operation further comprises:
upon determining that the instruction is for a MMIO write operation to the coherent accelerator, ignoring the instruction and incrementing the program counter to a subsequent instruction.

15. The system of claim 13, wherein a value of the invalid data is negative one, wherein the invalid data indicates to the faulting process that the coherent accelerator is inaccessible, via MMIO, from the processor, and wherein the faulting process ceases requests to perform MMIO operations to the coherent accelerator upon indication of the invalid data.

16. A computer program product, comprising:
a non-transitory computer-readable storage medium having computer-readable program code embodied therewith, the computer-readable program code executable by one or more computer processors to perform an operation comprising:
upon determining that a processor is unable to access a coherent accelerator via a MMIO operation, deleting one or more page table entries associated with MMIO of one or more hardware contexts of the coherent accelerator;
detecting a page fault associated with execution of a process by the processor after deleting the page table entries; and
upon determining that the page fault was caused by the process attempting to access one of the deleted page table entries while executing a MMIO operation, emulating the execution of the MMIO operation for the faulting process.

17. The computer program product of claim 16, wherein the operation further comprises:
upon detecting the page fault, receiving information that specifies at least one of an effective address that triggered the page fault, and a program counter for the faulting process.

18. The computer program product of claim 17, wherein determining that the page fault was caused by the process attempting to access one of the deleted page table entries comprises identifying that the effective address belongs to a range of addresses used for MMIO between the processor and the coherent accelerator.

19. The computer program product of claim 16, wherein emulating execution of the MMIO operation comprises:
locating an instruction for the MMIO operation based on the program counter; and
parsing a bit pattern for the instruction to determine one or more characteristics of the MMIO operation, wherein the one or more characteristics indicate at least one of a type of MMIO instruction, a source memory location, and a destination memory location.

20. The computer program product of claim 19, the operation further comprising:
upon determining that the instruction is for a MMIO read operation to the coherent accelerator, returning an outcome of the emulated execution to the faulting process and incrementing the program counter to a subsequent instruction, wherein the outcome comprises invalid data, and wherein the process ceases requests to perform MMIO operations to the coherent accelerator upon indication of the invalid data; and
upon determining that the instruction is for a MMIO write operation to the coherent accelerator, ignoring the instruction and incrementing the program counter to a subsequent instruction.

* * * * *